United States Patent
Gliwa

(10) Patent No.: US 10,831,639 B2
(45) Date of Patent: Nov. 10, 2020

(54) METHOD AND DEVICE FOR NON-INTRUSIVELY COLLECTING FUNCTION TRACE DATA

(71) Applicant: Gliwa GmbH Embedded Systems, Weilheim (DE)

(72) Inventor: Peter Gliwa, Weilheim (DE)

(73) Assignee: Gliwa GmbH Embedded Systems, Weilheim (DE)

( * ) Notice: Subject to any disclaimer, the term of this patent is extended or adjusted under 35 U.S.C. 154(b) by 0 days.

(21) Appl. No.: 16/060,310

(22) PCT Filed: Dec. 8, 2016

(86) PCT No.: PCT/EP2016/080192
§ 371 (c)(1),
(2) Date: Jun. 7, 2018

(87) PCT Pub. No.: WO2017/097878
PCT Pub. Date: Jun. 15, 2017

(65) Prior Publication Data
US 2018/0365127 A1 Dec. 20, 2018

(30) Foreign Application Priority Data
Dec. 8, 2015 (EP) .................................. 15198552

(51) Int. Cl.
*G06F 11/36* (2006.01)
*G06F 11/34* (2006.01)

(52) U.S. Cl.
CPC ...... *G06F 11/3636* (2013.01); *G06F 11/3466* (2013.01); *G06F 11/3471* (2013.01);
(Continued)

(58) Field of Classification Search
CPC .... G06F 8/41; G06F 11/3466; G06F 11/3471; G06F 11/3476; G06F 11/3624; G06F 11/3636; G06F 11/364
(Continued)

(56) References Cited

U.S. PATENT DOCUMENTS

| | | | | |
|---|---|---|---|---|
| 6,119,254 A | * | 9/2000 | Assouad | G06F 11/261 714/724 |
| 7,886,287 B1 | * | 2/2011 | Davda | G06F 9/322 717/168 |

(Continued)

FOREIGN PATENT DOCUMENTS

EP    1039386    9/2000

OTHER PUBLICATIONS

Hedde, D., et al., A non intrusive simulation-based trace system to analyse Multiprocessor Systems-on-Chip software, 22nd IEEE International Symposium on Rapid System Prototyping, May 24-27, 2011, pp. 106-112, [retrieved on Jul. 1, 2020], Retrieved from the Internet.*

(Continued)

*Primary Examiner* — Geoffrey R St Leger
(74) *Attorney, Agent, or Firm* — Burns & Levinson LLP; George N. Chaclas

(57) ABSTRACT

A method and a device for non-intrusively collecting function trace data of a software application running on a processor-core, comprising translating a source code of the software application which comprises traceable function source code into executable code. The steps to execute the executable code include allocating the executable code of the traceable function within at least one pre-defined code memory region, checking each function call or jump instruction for its target address, and if the target address is located (Continued)

within the pre-defined code memory region, logging the execution of the traceable function.

12 Claims, 2 Drawing Sheets

(52) U.S. Cl.
CPC ........ *G06F 11/3476* (2013.01); *G06F 11/364* (2013.01); *G06F 11/3624* (2013.01)

(58) Field of Classification Search
USPC .......................................... 717/127, 128, 140
See application file for complete search history.

(56) References Cited

U.S. PATENT DOCUMENTS

| | | | | |
|---|---|---|---|---|
| 8,161,304 B2* | 4/2012 | Hamilton | .............. | G06F 1/3203 713/320 |
| 8,473,922 B2* | 6/2013 | Li | ................... | G06F 11/3612 709/201 |
| 8,984,344 B2* | 3/2015 | Moyer | ................ | G06F 11/3648 714/37 |
| 9,021,445 B2* | 4/2015 | Gataullin | ............ | G06F 11/3636 717/128 |
| 9,361,102 B2* | 6/2016 | Tan | .................... | G06F 9/30058 |
| 2003/0056200 A1* | 3/2003 | Li | ........................ | G06F 11/323 717/128 |
| 2003/0145309 A1 | 7/2003 | Inamdar | | |
| 2005/0033553 A1* | 2/2005 | Swaine | ............... | G06F 11/3476 702/176 |
| 2008/0178292 A1* | 7/2008 | Stauner | ............... | G06F 12/1441 726/23 |
| 2009/0089861 A1* | 4/2009 | Catalano | ................ | G06F 21/85 726/3 |
| 2009/0222646 A1 | 9/2009 | Ohba et al. | | |
| 2011/0202801 A1* | 8/2011 | Horley | .................. | G06F 11/348 714/45 |
| 2014/0317454 A1* | 10/2014 | Gataullin | ............ | G06F 11/3636 714/45 |
| 2015/0370560 A1* | 12/2015 | Tan | ..................... | G06F 9/30058 717/148 |

OTHER PUBLICATIONS

Todorov, V., et al., Non-Intrusive Trace & Debug NoC Architecture with Accurate Timestamping for GALS SoCs, Proceedings of the eighth IEEE/ACM/IFIP international conference on Hardware/software codesign and system synthesis, Oct. 2012, pp. 181-186, [retrieved on Jul. 1, 2020], Retrieved from the Internet.*
European Search Report for European Patent Application No. 15198552.0, dated May 25, 2016, 8 pages.
International Search Report and Written Opinion for International Application No. PCT/EP2016/080192, dated Jan. 23, 2017, 10 pages.

* cited by examiner

```
/*--------------------------------*/
void SomeFunction(void)
{
    /* do something */
}
/*--------------------------------*/
void Runnable1(void)__attribute__((section(".NITRAC")))
{
    /* do something else */
}
/*--------------------------------*/
void Runnable2(void)__attribute__((section(".NITRAC")))
{
    /* do whatever needs to be done */
}
/*--------------------------------*/
void Runnable3(void)__attribute__((section(".NITRAC")))
{
    SomeFunction();
}
/*--------------------------------*/
TASK (5ms_task)
{
    Runnable1();
    Runnable2();
    TerminateTask();
}
/*--------------------------------*/
TASK (1ms_task)
{
    Runnable3();
    TerminateTask();
}
```

METHOD AND DEVICE FOR NON-INTRUSIVELY COLLECTING FUNCTION TRACE DATA

CROSS-REFERENCE TO RELATED APPLICATIONS

This application is the U.S. national phase entry under 35 U.S.C. § 371 of International Application No. PCT/EP2016/ 0580192, filed Dec. 8, 2016, entitled METHOD AND DEVICE FOR NON-INTRUSIVELY COLLECTING FUNCTION TRACE DATA, which in turn claims priority to and benefit of European Patent Application No. 15198552.0, filed Dec. 8, 2015; each of which is incorporated herein by reference in their entirety for all purposes.

The present invention concerns a method and a device for non-intrusively collecting function trace data of a software application running on a processor, specifically on a processor-core.

The development of reliable and efficient software is of utmost importance, especially when such software is employed in areas which are directly relevant to safety or health of persons, animals or property. Typical examples of such extremely sensitive areas include the ever increasing use of software in automotive applications, where in addition to the potential safety and health impact, the software is often executed in a time-critical real-time environment.

A large variety of tools have been developed to aid in debugging and optimizing software. With respect to scheduling analysis or timing analysis, tools have been developed which help planning, understanding, optimizing and securing software execution with respect to its timing requirements. These timing requirements are usually dealt with on different levels of integration, for instance on a system or network level, where the ultimate performance requirements are defined which are then broken down to a real-time operating system level (RTOS-level) and even to a code level where the core execution time of code fragments, for instance a single function, are analyzed. For different levels of integration, different analysis techniques have been developed, such as static code analysis, code simulation, scheduling analysis and scheduling simulation, tracing techniques and various types of measurement techniques for the running system.

Tracing techniques are a type of software debugging and performance analysis where the collection of a trace data enables the reconstruction of a monitored program flow so that one can determine which kind of events took place at which particular point in time during execution of a software application. For dedicated events, time stamps together with appropriate event information are continuously logged. The selection of events can be very fine-grained like flow traces which allow reconstructing the execution of each machine instruction or coarse-grained like tracing scheduling-related events only, thus allowing the execution of a software application to be analyzed on different levels of granularity.

Tracing can be based on dedicated tracing hardware or on instrumentation, i.e. software modification.

Hardware-based tracing captures each taken branch and, by post-processing, extends the trace data to an instruction trace, also known as a flow-trace (in the present context, a "branch" denotes any kind of machine instruction that sets the program counter to any program-address other than the next address). An instruction trace can be seen as a long list of instructions plus time stamps sequentially showing all the instructions which have been executed and at which point in time. Hardware-based tracing is usually non-intrusive, i.e. it does not require the software application to be modified, but it produces a lot of data/information and therefore requires special high band-width interfaces. These drawbacks are aggravated when microprocessors with more than one core are to be analyzed because tracing has to be done for each core separately.

In instrumentation-based tracing, the software application to be analyzed is modified by introducing additional instructions which capture selected points in time. For scheduling traces, these instructions typically comprise activation, start and termination of tasks as well as start and end of interrupts. In the present description, a "task" denotes a collection of software that executes sequentially and often, but not necessarily, periodically. Tasks may comprise one or more subroutines, e.g. functions. A "function" in the sense of the present description is a dedicated subroutine within a software application which can be accessed one or more times during execution of the software application via dedicated call or jump instructions. A function is usually terminated by a return instruction, which transfers control to the instruction following the initial call instruction. In the sense of the present invention, the term "functions" also includes "runnables" which designate a function without parameters and without a return value and which are called directly from a task or an interrupt. Tracing the execution of instructions is accomplished by creating associated "events" which are written with corresponding time stamps into a storage. Analyzing the contents of the storage allows the reconstruction of scheduling, i.e. determining which tasks and interrupts got executed at which point in time. However, instrumentation-based tracing suffers from the drawback that it is necessary to modify the software to be traced. Such a modification will have an influence on the timing properties of the software itself so that the results of a timing analysis do not completely reflect the corresponding behavior of the software as initially developed.

In US patent application US 2009/0222646 A1, a method and an apparatus for detecting processor behavior in real time using instruction trace data is described. The method and apparatus described therein identifies one or more call addresses from which a function to be observed is called and establishes one or more end or return addresses of the function. The call and end/return addresses are stored and compared with a branch address contained in the instruction trace data to detect start and end of the function dynamically in real time. In order to avoid that the monitoring apparatus needs to know the ranges of the memory spaces being used by all of the functions, US 2009/0222646 A1 suggests detecting the start and end of the execution of each function by using the start address of the function and a table of the return addresses of the functions of interest. While the method of prior art allows to reduce the required storage capacity, the known process still has to identify the start and end/return address of each function to be traced. It is therefore still a complex task implementing the tracing scheme of US 2009/022646 A1 both in hardware and/or in software as soon as a larger number of functions has to be traced.

Therefore, the technical problem underlying the present invention is to provide a method and a device for non-intrusively collecting function trace data of a software application running on a processor-core, which requires less band-width than conventional hardware-based solutions and which allows logging trace data on a higher level than individual machine instructions without interfering with the software code itself.

According to the present invention, this technical problem is solved by the method of present claim 1 and the device of present claim 13. Preferred embodiments of the method and the device of the invention are subject to the dependent claims.

Accordingly, the present invention concerns a method for non-intrusively collecting function trace data of a software application running on a processor-core, the method comprising translating a source code of the software application into a machine-readable executable code, typically a binary code. The source code comprises functions which are to be traced. These functions are hereinafter designated as "traceable functions". After translation of the software, the executable code comprises a corresponding binary code of these functions. "Translation" of code may involve any type of converting a higher-level source code into a machine-readable executable binary code. Typically, such conversion involves at least compiling and linking. According to the invention, during execution of the executable code, any executable code of the traceable function will be allocated within at least one pre-defined code memory region of a code memory associated with the processor-core. Further, any function call instruction or jump instruction will be checked for its target address. If it is determined that the target address is located within one of the pre-defined code memory regions, the execution of the traceable function will be logged.

With the method of the present invention, it is possible to determine the execution of traceable functions within a software application merely by determining whether, at run-time, the function has been stored within a pre-defined code memory region. Consequently, it is not necessary for tracing purposes, to modify the source code of the software application, specifically the source code of the traceable function itself. Consequently, reliability of the software application, especially as far as time-critical performance is concerned, is greatly improved because the software can be tested and traced in a version which is actually employed in a real-world application, without having to modify the software code originally developed by the manufacturer merely for tracing purposes.

As compared with the method of US 2009/0222646 A1, the method of the present invention does not require storing and analyzing twice as many addresses as functions to be traced (i.e. start and end/return addresses), rather, the method of the present invention merely has to determine whether the target address of a traceable function is located within a pre-defined code memory region which is defined by its start and end addresses, irrespective of the number of traceable functions located within said pre-defined code memory region.

In the present application, a "processor-core" designates the unit of a microprocessor which reads and executes software instructions, typically also designated as central processing unit (CPU). The microprocessor may be part of a general purpose computer system or of a dedicated embedded system. The present invention may be performed on microprocessors having only one processor-core or on microprocessors having more than one core. In any event, the tracing method according to the invention has to be carried out specifically with respect to each individual processor core, i.e. in case of a microprocessor with more than one core, tracing has to be carried out for each core separately.

"Logging" in the sense of the present invention comprises any means for determining whether and when a particular function has been carried out.

In some cases, it may be sufficient to determine the start of an executable function. Preferably, however, in addition to determining the start of the execution of a traceable function, logging the execution of the traceable function further comprises logging the end of the execution of the function. As a function is generally ended with a return instruction, logging the execution of the traceable function preferably further comprises checking an associated return instruction for its associated opcode address, i.e. the address of the machine-readable executable code corresponding to the return instruction. If this opcode address is located within the pre-defined memory region, the logging of the traceable function is terminated.

In a preferred embodiment of the method of the invention, "logging" means that an event is created relating to the execution of the function, and this event is stored together with an appropriate time stamp, indicating the point in time at which the event took place, in a storage medium. According to this preferred embodiment, logging the execution of the traceable function further comprises generating a function start event if the target address of the function call instruction is located within the pre-defined code memory region and by generating a function end event if the opcode address of the associated return instruction is located within the pre-defined code memory region.

Preferably, the function start and end events are stored by an on-chip trace unit, e.g. in a ring buffer of the on-chip trace unit. Such tracing units are already present on many commercially available microprocessors, e.g. the CORTEX processor family designed by ARM or the XC166/XC2000 processor family commercialized by Infineon. Alternatively, the on-chip trace unit can be used to make events available to an external trace-logic which can store the data and in some cases also generate associated time stamps. Also, on-chip timers or external timers can be used to generate time stamps associated with events.

In many cases, not all functions of a software application need to be traced. In order to determine which functions are to be traced, the corresponding functions have to be identified as traceable functions so that their executable code can be allocated in the pre-defined code memory region. According to a preferred embodiment of the method of the invention, the traceable functions are allocated in the pre-defined code memory region via compiler or linker directives. For instance, identification of the traceable functions can be accomplished directly during linking, e.g. by setting up an appropriate linker control file which comprises instructions allocating the respective functions in the pre-defined code memory region. In another embodiment, traceable function may be identified on a source code level, e.g. via appropriate attributes or pragmas. Accordingly, if the compiler detects an appropriate identifier, the compiled object code is generated with an identifier for the subsequent linking process, ensuring that the traceable function is stored within a certain area of the code memory. Typically this is achieved by assigning functions to so called sections at compile time which then get mapped to memories at linking/locating time according to the mapping specified in the linker control file. In this context, "compiler" refers to any tool generating object code and "linker" refers to any tool locating all symbols (e.g. functions and variables) to dedicated memory locations and generating an executable binary.

Usually, the software application will include a large variety of traceable functions. In order to identify the particular function, each traceable function can be identified by its respective start address. This start address is preferably included in the recorded function start event. In order to gain more information about traceable functions, e.g. information about its core execution time, one can also record the opcode address of the corresponding return instruction with the function end event.

According to a preferred embodiment of the method of the invention, more than one pre-defined code memory regions are used in order to allocate traceable functions therein. Preferably, if more than one pre-defined code memory regions are used, the code memory regions can selectively be enabled and disabled. Accordingly, it is possible to define hierarchies of traceable functions by locating them in different pre-defined code memory regions. By selectively enabling or disabling these code memory regions, one can selectively trace and display the execution of functions of different hierarchies. In another application, traceable functions may be grouped according functional aspects in different pre-defined code memory regions. For instance, in an embedded system employed in the control unit of a combustion engine, functions relating to air/fuel ratio control may be allocated to one pre-defined code memory region while functions relating to valve timing may be allocated in another pre-defined code memory region. Accordingly, by selectively enabling and disabling code memory regions, functions relating to a particular control type may be selectively traced and displayed.

According to a preferred embodiment of the method of the invention, the start-address and end-address of the pre-defined code memory region of functions to be traced can be reconfigured at run-time thus allowing to dynamically selecting functions to be traced.

The method of the invention can also comprise logging interrupts. Conventional on-chip trace units typically already have implemented suitable means for logging interrupts, e.g. by logging events generated by the interrupt control unit of a microprocessor.

If no conventional means for logging interrupts are available, tracing of interrupts can also be accomplished by the method and device of the present invention. For instance, all interrupt service routines (ISRs) can be located within the pre-defined code memory region. Alternatively, depending on the processor architecture, the pre-defined code memory region can be mapped on an interrupt vector table.

Due to a large variety of jump instructions typically present in a software application, tracing jumps can be a complex task. In one embodiment of the invention, only such jump instructions will be traced which have been generated by the compiler in an optimization process denoted "tail-call optimization" from initial function call instructions in the source code. In another embodiment of the invention, only function call instruction but no jump instructions are traced, i.e. are checked for their respective target addresses. In this case, one has to ensure that during translation of source code of the software application into executable code, no initial call instructions are converted into jump instructions, i.e. "tail-call optimization" has to be disabled. A resulting small trade-off in performance of the software is counterbalanced by a simplified tracing.

In certain embodiments of the invention, the pre-defined code memory region does not only comprise function calls but actual executable code. This code might include, for instance, a loop which is compiled to object code including jumps or even calls. However, when such jumps or calls are executed, it is usually not desired that a start event is traced. Therefore, in addition to checking whether the opcode is a call or a jump and whether the target address is located in the pre-defined code memory region, an additional check determines whether the opcode is located outside of the target pre-defined code memory region. By introducing this additional check, it can be ensured that a start event is only generated when execution of code inside the pre-defined code memory region is initiated (e.g. by calls or jumps) from outside the pre-defined code memory region. Any jumps and calls located inside the pre-defined code memory region ("internal calls/jumps") will not generate a trace start event.

In a further embodiment, this additional check is configurable, i.e. it can be disabled or enabled depending on whether internal calls/jumps shall be traced or not. This allows avoiding problems when functions to be traced call each other, e.g. one runnable calling another runnable. With the additional check active, the second runnable's start would not get traced if both runnables reside in the same pre-defined code memory region.

The logged traceable functions can finally be evaluated by scheduling analysis or timing analysis of the software application running on the processor-core. The corresponding traces can be visualized and analyzed, e.g. for debugging purposes.

The method of the present invention can be implemented both in software, e.g. as part of any kind of virtual machine emulating a microprocessor or, preferably, directly in hardware, e.g. on the microprocessor whose core(s) shall be traced itself. Thus, the present invention also concerns a device for non-intrusively collecting function trace data of a software application comprising a code memory, at least one processor-core configured to execute instruction stored in the code memory, a control unit configured to transfer instructions from the code memory to the at least one processor-core, and a tracing unit configured to process events generated by the control unit. According to the invention, the control unit is further configured to generate a function start event to be passed to the tracing unit if an instruction is a function call instruction or a jump instruction having a target address located within a pre-defined code memory region. Typically, the corresponding hardware of the control unit for generating function start events is located between an opcode fetch unit of the processor and the code memory.

The control unit can also be configured to generate function end events to be passed to the tracing unit if an instruction is a return instruction and the opcode address of the return instruction is located within the pre-defined code memory region.

For storing the events generated by the control unit, the tracing unit can provided with a dedicated storage, for instance with a ring buffer, or can access another storage of the microprocessor or even an external storage medium.

The invention will now be described in connection with the enclosed schematic drawings in more detail. In the drawings.

A software application running on a microprocessor, or more specifically, on a processor-core, can be subdivided into a number of tasks which are executed sequentially on the processor-core. Each task consists of one or more functions or runnables. Tasks are typically classified according to their priority, i.e. a higher priority task may interrupt the execution of a lower priority task and will be executed before execution of the lower priority task is resumed. Accordingly, a task is associated with different states. Upon activation, a task is ready for execution. Upon start or resumption of a task, the task is running until it is either terminated to assume a terminated state or preempted to resume the ready state again. Preemption of a task occurs when it is interrupted before the task is terminated either via a dedicated interrupt or via the start of a task having a higher priority.

According to the invention, trace data of functions of individual tasks are collected via a dedicated interface of the processor.

Figures 1, 2:
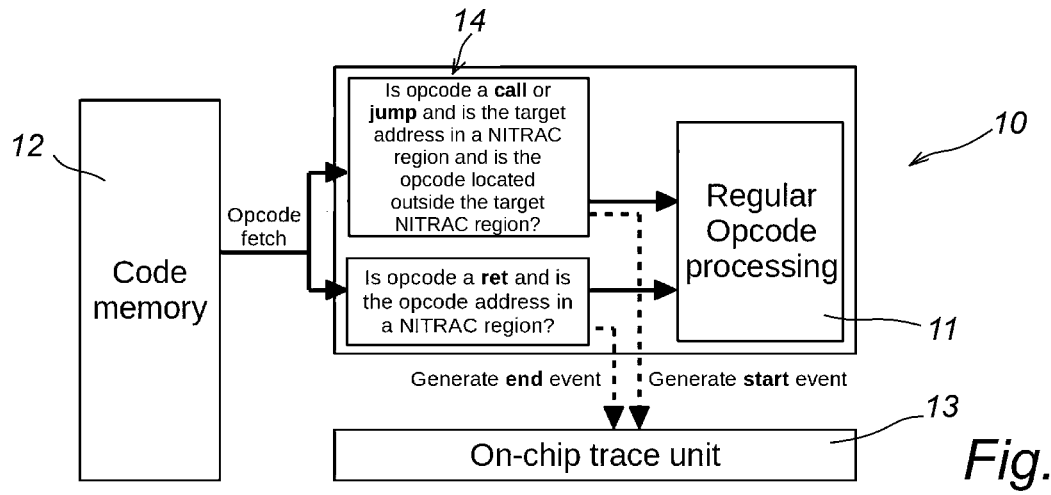
FIG. 1 shows a schematic embedded system which is configured to execute the method of the invention.
FIG. 2 shows a simple C-code example implementing tasks of a non-traceable and a traceable function.

FIG. 1 shows a typical example of an embedded microprocessor 10 and some its peripherals in a very schematic and simplified manner. A much more detailed description of such microprocessors can be found in technical documentation of processor developers such as Infineon or ARM. Typically, embedded systems employ a system on a chip (SoC) design where processor core an peripherals are integrated into a single chip. In the present example, the microprocessor comprises a processor-core 11 and peripherals, such as at least one code memory 12 where the executable instructions are stored, and an on-chip trace unit 13. The microprocessor comprises an opcode fetch unit which sequentially transfers instructions from the code memory to the processor-core where the instructions are executed. Between the code memory and the processor-core a control unit 14 is implemented which determines whether a particular opcode is a function call or jump instruction. If such an instruction is detected, it is further determined whether the target address of the call or jump instruction is within a pre-defined area of the code memory 12 (denoted "NITRAC region" in FIG. 1).

Optionally, an additional check determines whether the opcode is located outside of the target pre-defined code memory region thus ensuring that a start event is only generated when execution of code inside the pre-defined code memory region is initiated (e.g. by calls or jumps) from outside the pre-defined code memory region. If this is the case, a start event is generated and stored, together with an appropriate time stamp and the respective target address by the on-chip trace unit 13. The code in the pre-defined code memory region is executed until a return instruction is reached. The control unit 14 of the microprocessor 10 determines whether the opcode address of the return instruction is in the pre-defined code memory region. This will be the case if no further function call has intervened or if an intervening function call also has an address within a pre-defined code memory region. In any case, if the opcode address of the return instruction is also located in the pre-defined memory region, an end event is generated together with a time stamp and the opcode address and stored by the on-chip trace unit 13.

In FIG. 2, a sample code in the programming language C is depicted showing how certain functions are identified as traceable functions on a source code level. As can be taken therefrom, a function denoted "SomeFunction" is defined which itself is not traced. Further functions denoted as "Runnable1", "Runnable2" and "Runnable3", respectively, are defined as traceable functions on a source code level via an attribute "section(".NITRAC")" indicating that the executable code of the corresponding functions should be stored in a dedicated pre-defined code memory region designated as "NITRAC" region in the depicted sample. The actual code performed by the function and the runnables is not depicted but comments in the code example show that each function and runnable has a different purpose, except for "Runnable3" which simply calls the function "SomeFunction". The code example of FIG. 2 further defines two tasks which are designated via their respective execution times ("5ms_task" and "1ms_task", respectively). The first task calls runnables 1 and 2, and the second task calls runnable 3.

Figure 3:
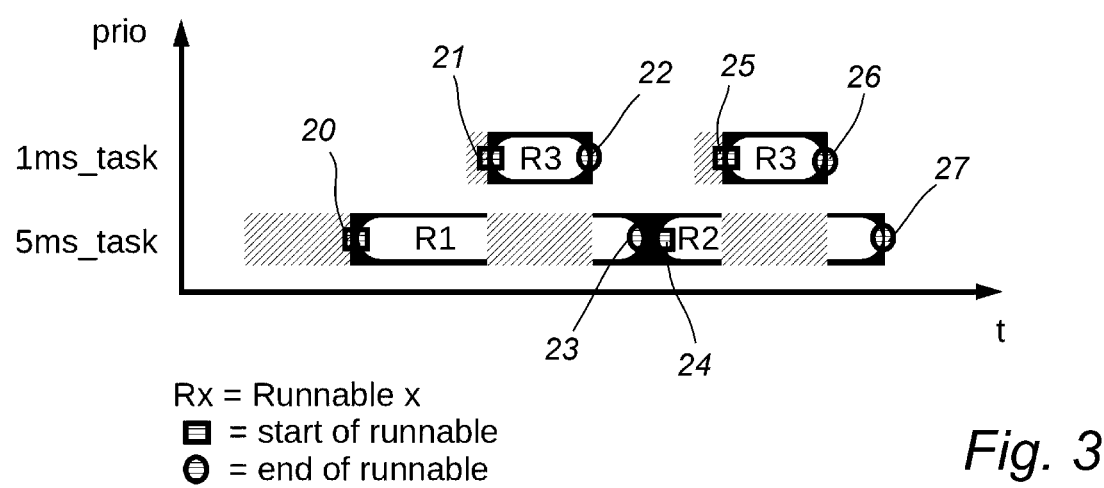
FIG. 3 shows trace points generated by the method of the invention.

FIG. 3 shows a tracing scheme generated upon the execution of the corresponding tasks. Accordingly, the 1ms_task is assigned a higher priority than the 5ms_task. The 5ms_task is activated (hatched area in FIG. 3) and upon start of runnable 1, a corresponding start event is logged designated by reference sign 20. Before runnable 1 (R1) has been completed, runnable 3 (R3) of the higher priority 1ms_task has been started, also creating a corresponding start event 21. Runnable 3 is regularly terminated and a corresponding end event 22 is created. Subsequently, runnable 1 is resumed and upon termination, a corresponding end event 23 is created. After termination of runnable 1, runnable 2 (2) is started with creation of a corresponding start event 24. Again, the execution of runnable 2 is suspended by execution of runnable 3 of higher priority 1ms_task creating corresponding start 25, which is terminated creating a corresponding end event 26 before execution of runnable 2 can be resumed, also creating a corresponding end event 27 upon its termination. From these data, flow traces similar to those depicted in FIG. 3 can be derived and depicted via a suitable scheduling and timing analysis software.

The invention claimed is:

1. Method for non-intrusively collecting function trace data of a software application running on a processor-core having an associated code memory, the method comprising the steps of:
   translating a source code of the software application which comprises traceable function source code into non-instrumented executable code and, when executing the non-instrumented executable code;
   allocating the non-instrumented executable code of more than one traceable function within one pre-defined code memory region, said pre-defined code memory region being defined by pre-defined code memory region start and end addresses located within the associated code memory;
   checking each function call or jump instruction for a target address;
   and, if the target address is located within the pre-defined code memory region, logging the execution of the traceable function.

2. Method according to claim 1, wherein logging the execution of the traceable function further comprises checking an associated return instruction for a respective opcode address and if the opcode address is located within the pre-defined code memory region, logging an end of the traceable function.

3. Method according to claim 2, wherein logging the execution of the traceable function further comprises generating a function start event if the target address of a function call is located within the pre-defined code memory region and generating a function end event if the opcode address of an associated return instruction is located within the pre-defined code memory region.

4. Method according to claim 3, where the function start and end events are stored by an on-chip trace unit.

5. Method according to claim 1, wherein the traceable functions are located in the pre-defined code memory region via compiler or linker directives.

6. Method according to claim 1, wherein different traceable functions are identified via their respective start addresses within the pre-defined code memory region.

7. Method according to claim 1, comprising more than one pre-defined code memory region.

8. Method according to claim 7, wherein the pre-defined code memory regions can selectively be enabled and disabled.

9. Method according to claim 1, comprising reconfiguring the start-address and end-address of the pre-defined code memory region at run-time.

10. Method according to claim 1, further comprising logging interrupts.

11. Method according to claim 1, where the source code of the software application is translated into the non-instrumented executable code with tail-call optimization being disabled.

12. Method according to claim 1, further comprising the step of evaluating function start and end events for scheduling analysis or timing analysis of the software application running on the processor-core.

* * * * *